US008245200B2

(12) United States Patent
Baierl et al.

(10) Patent No.: US 8,245,200 B2
(45) Date of Patent: Aug. 14, 2012

(54) METHOD, SYSTEM, AND APPARATUS FOR DYNAMICALLY INJECTING LOGGING STATEMENTS INTO WEB 2.0 JAVASCRIPT APPLICATIONS

(75) Inventors: Michael Baierl, Vienna (AT); Peter Wansch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 12/171,935

(22) Filed: Jul. 11, 2008

(65) Prior Publication Data

US 2010/0011341 A1     Jan. 14, 2010

(51) Int. Cl.
*G06F 9/44* (2006.01)
(52) U.S. Cl. ........................................ 717/130
(58) Field of Classification Search .................. 717/130
See application file for complete search history.

(56) References Cited

U.S. PATENT DOCUMENTS

| | | | | |
|---|---|---|---|---|
| 6,061,518 A * | 5/2000 | Hoffman | ........................ | 717/124 |
| 6,539,501 B1 * | 3/2003 | Edwards | .......................... | 714/45 |
| 2005/0223283 A1 | 10/2005 | Frey et al. | | |
| 2006/0129605 A1 | 6/2006 | Doshi | | |
| 2006/0184410 A1 | 8/2006 | Ramamurthy et al. | | |
| 2006/0200806 A1* | 9/2006 | Tasinga | .......................... | 717/128 |
| 2007/0107057 A1* | 5/2007 | Chander et al. | .................. | 726/22 |
| 2007/0168558 A1 | 7/2007 | Taylor et al. | | |
| 2007/0225943 A1 | 9/2007 | Marano | | |
| 2007/0250618 A1 | 10/2007 | Hammond | | |

OTHER PUBLICATIONS

"Ajax View: Remotely Monitoring Web 2.0 Applications", http://research.microsoft.com/projects/ajaxview, Accessed May 12, 2008.
Johns, "JavaScript Closures for Dummies", Developing Thoughts, http://blog.morrisjohns.com/javascript_closures_for_dummies.html, Feb. 21, 2006.
"Improving Your Web Browser", Google Gears, http://gears.google.com/, May 21, 2008.
"Firebug Web Development Evolved", http://www.getfirebug.com/, May 21, 2008.
Javascript Closures, http://www.jibbering.com/faq/faq_notes/closures.html, May 21, 2008.
Prechelt, "Course "Debugging" Logging and Tracing", FreieUniversitätBerlin, InstitutfürInformatik, http://www.inf.fu-berlin.de/inst/ag-se/; Jun. 2007.
Kiciman et al., "Live Monitoring: Using Adaptive Instrumentation and Analysis to Debug and MaintainWeb Applications"; May 2007.
Kiciman et al., "AjaxScope: A Platform for Remotely Monitoring the Client-Side Behavior of Web 2.0 Applications", Oct. 2007.

* cited by examiner

*Primary Examiner* — Philip Wang
(74) *Attorney, Agent, or Firm* — Kunzler Needham Massey & Thorpe

(57) ABSTRACT

A Method, System and Apparatus for dynamically injecting logging statements into Web 2.0 JavaScript applications includes a single block of JavaScript code configured to execute on a client device by loading a profiler JavaScript code into memory on the client device and registering a target JavaScript object. The profiler JavaScript code is configured to dynamically scan the user-defined JavaScript code and modify the functions to add events to a modified user-defined code which include an identification of when the function was called, when the function was exited and when an exception occurs. The modification module is wrapped into a try/catch block so that exceptions can be handled and posted back to the server or displayed to the user or developer.

8 Claims, 2 Drawing Sheets

METHOD, SYSTEM, AND APPARATUS FOR DYNAMICALLY INJECTING LOGGING STATEMENTS INTO WEB 2.0 JAVASCRIPT APPLICATIONS

BACKGROUND OF THE INVENTION

1. Field of the Invention

The invention relates to JavaScript application profiling. More specifically, the invention relates to injecting logging statements into Web 2.0 JavaScript applications to trace a target JavaScript object.

2. Description of the Related Art

One of the problems in the Web 2.0 world is serviceability of client code and the unknown factor "browser". Developers do not know which browser will be used and which features that browser might support currently or in a future release. Web 2.0 applications written in JavaScript provide only very basic features for logging in support of tracing and debugging, mainly by changing the source code during development time. The requirement for logging to fix runtime problems is not only important in support of development and quality assurance but also in support of problem determination after an application has been deployed. More and more applications rely heavily on the use of JavaScript, not only for traditional browser applications, but also applications running on portable devices such as the iPhone™.

Today no solution exists that allows a developer to trace JavaScript code execution on the client side without installing additional client software, re-writing the JavaScript using a proxy, or convoluting the source code with explicit logging statements.

The present invention solves the problem by allowing a developer to get information about which functions have been called, what parameters have been passed and the timing information of the function calls through dynamic injection of logging code without the need to install client side software, re-writing the JavaScript using a proxy, or adding explicit logging statements. Furthermore exceptions are caught and can be reported either back to the server to be sent to a repository so that the developers can review the stack dump for further analysis or the information can be displayed in a client widget, etc.

SUMMARY OF THE INVENTION

The present invention has been developed in response to the present state of the art, and in particular, in response to the need to provide a flexible client side JavaScript application logging apparatus, system and method.

In one embodiment, the present invention includes a computer program product configured to trace Java Script code execution on a client device executing JavaScript code. The operations of the computer program product comprise receiving a profiler JavaScript code and a user-defined JavaScript code on a client device from a server. The profiler JavaScript code is loaded in memory on the client device. The profiler JavaScript code is configured to dynamically redefine each function of a registered target JavaScript object in the memory on the client device. The user-defined JavaScript code is loaded into memory on the client device. The user defined JavaScript code comprises a registration JavaScript instruction. A target JavaScript object is registered in memory on the client device in response to loading the registration JavaScript instruction. The registration JavaScript instruction identifies the target JavaScript object which is defined in the user-defined JavaScript code. The profiler dynamically loads the registered target JavaScript object. The user-defined JavaScript code is modified at runtime in memory on the client device for each JavaScript object identified by the registration JavaScript instruction. The modified user-defined JavaScript object is stored in memory on the client device.

In one embodiment the logging code comprises an event added to each function of the target JavaScript object of the modified user-defined JavaScript object identifying when the function of the target JavaScript object is called. The logging code further comprises an event added to each function of the target JavaScript object of the modified user-defined JavaScript code identifying when the function of the target JavaScript object is exited. The logging code also comprises an event added to each function of the target JavaScript object of the modified user-defined JavaScript code identifying when an exception occurs within the function of the target JavaScript object.

The execution of each function of the modified user-defined JavaScript object is logged in response to runtime calls to the function of the modified user-defined JavaScript object from the user-defined JavaScript code.

In certain embodiments the log of the modified user modified user-defined JavaScript object is outputted. In one embodiment the log is outputted by displaying the log in a user interface of the client device. In one embodiment the log is outputted by displaying a message describing an exception in a user interface of the client device. In one embodiment the log is outputted by posting the log to a server that sent the user-defined JavaScript code.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
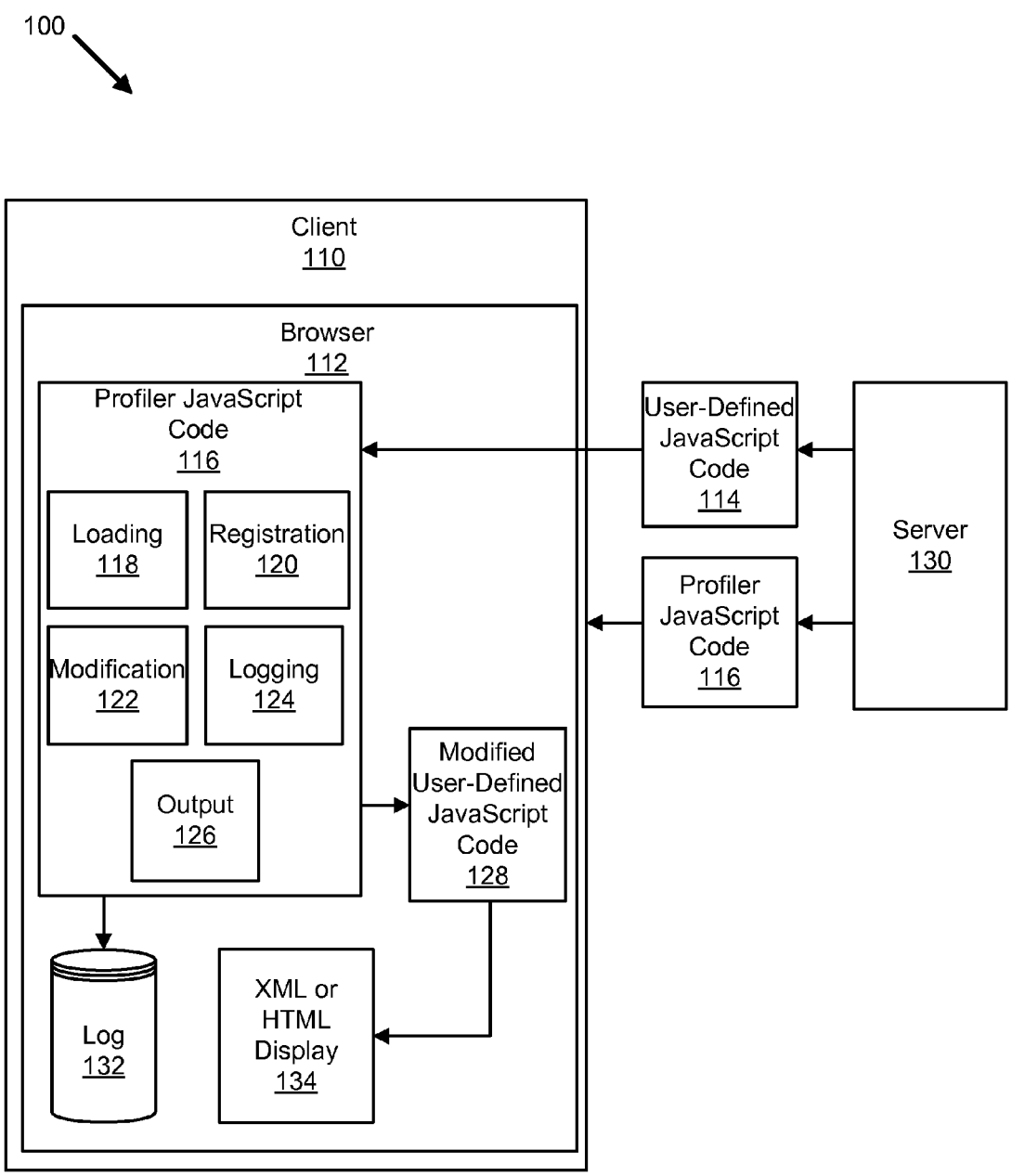
FIG. 1 is a schematic block diagram illustrating a system for injecting logging statements into Web 2.0 JavaScript applications.

It will be readily understood that the components of the present invention, as generally described and illustrated in the figures herein, may be arranged and designed in a wide variety of different configurations. Thus, the following more detailed description of the embodiments of the apparatus of the present invention, as represented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wire line, optical fiber cable, RF, etc.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a system 100 for dynamically injecting logging statements into Web 2.0 JavaScript applications to allow a developer to trace JavaScript objects or functions to identify exceptions or runtime errors. The system 100 comprises a JavaScript enabled application such as a browser 112 disposed on a client 110 and a server 130.

The server 130 may be a web server or application server such IBM's WebSphere server. The server 130 is configured to deliver a profiler JavaScript code 116 and a user-defined JavaScript code 114 to the client 110 over a network. In certain embodiments the user-defined JavaScript code 114 comprises any JavaScript application configured to be executed on the client 110. The user-defined JavaScript code 114 may include a single JavaScript file, a XML or HTML file with embedded JavaScript, one or more JavaScript libraries, or a combination of these.

The profiler JavaScript code 116 is configured to exploit the dynamic behavior of JavaScript to modify objects and functions at runtime to inject logging code into the user-defined JavaScript code 114. The profiler JavaScript code 116 comprises a loading module 118, a registration module 120, a modification module 122, a logging module 124 and an output module 126.

The loading module 120 is configured to load the profiler JavaScript code 116 into memory on the client 110. The loading module 120 is further configured to load the user-defined JavaScript code 114 into memory on the client 110.

The registration module 120 is configured to register a target JavaScript object in memory on the client 110. In certain embodiments in order to use the present invention, a JavaScript developer simply includes a single JavaScript file that contains the profiler JavaScript code 116 and a registration JavaScript instruction that invokes the registration module 120 to register the target JavaScript object the JavaScript developer wants to trace. The target JavaScript object comprises a JavaScript object found in the user-defined JavaScript code 114. The registration JavaScript instruction may register a single target JavaScript object, a plurality of target JavaScript objects, or all target JavaScript objects in the user-defined JavaScript code 114.

The modification module 122 is configured to modify the user-defined JavaScript code 114 at runtime in memory on the client 110 to produce a modified user-defined JavaScript code 128. In certain embodiments the modification module 122 modifies all functions or methods contained within the user-defined JavaScript code 114 to produce the modified user-defined JavaScript code 128. In one embodiment, the modification module 122 dynamically looks through all methods and objects comprising the user-defined JavaScript code 114 and modifies only the methods or functions of the registered target JavaScript objects. The modified user-defined JavaScript code 128 resides in memory during its execution by the browser 112 to perform its intended functions.

The modification module 122 modifies the user-defined JavaScript code 114 by adding an event to each function or method of the JavaScript object at runtime in memory on the client 110 when the function of the JavaScript object is called. An additional modification of the user-defined JavaScript code 114 is performed by adding an event to each function of the JavaScript object when the function is exited. Another modification to the user-defined JavaScript code 114 is added when an exception occurs within the function of the JavaScript object. As discussed above, in certain embodiments, the modifications performed by the modification module 122 may be performed on all functions contained within the user-defined JavaScript code 114. In another embodiment, only the functions of the registered target JavaScript object are modified by the modification module 122.

The modification module 122 is disposed on the client 110 and is configured to modify the user-defined JavaScript code 114 without the aid of a proxy server between the client 110 and the server 130. Thus, the client 110 receives unaltered source code JavaScript comprising the user-defined JavaScript code 114 from the server 130. All modifications of the user-defined JavaScript code 114 by the modification module are performed on the client 110 to create the modified user-defined JavaScript code 128. Consequently, performance problems resulting from the use of a proxy server, such as bogging down the proxy server with multiple client requests, is avoided by distributing the task of modification of the user-defined JavaScript code 114 to each client 110 requesting the user-defined JavaScript code 114. Furthermore, in certain embodiments the use of a proxy server may be avoided altogether, freeing up additional computing resources.

The logging module 124 is configured to log the execution of the modified user-defined JavaScript objects each time a function of the target object is executed in response to a runtime call to the function. In certain embodiments the logging module 124 is configured to create a trace data structure such as a list, queue, or stack and add a new trace object each time a function of the registered target object is called or when an exception occurs. In certain embodiments the logging module 124 is configured to write a stack trace to a console. The logging module 124 may be configured to identify which functions are included within the stack as well as the value of each argument that was passed to each function. In certain embodiments the logging module 124 comprises a browser plug-in configured to facilitate writing a stack trace to a consol to give detailed runtime statistics about the user-defined JavaScript code 114. One example of a suitable implementation of a browser plug-in configured to facilitate writing a stack trace to a consol includes Firebug™ available at www.getfirebug.com. Of course software for writing of a trace data structure to console or log may be built into the logging module 124. In one embodiment the trace data structure created by the logging module 124 contains the traces of all registered function calls as long as the whole page that includes the JavaScript is not reloaded.

In certain embodiments the system 100 may further comprise a local data layer (not shown) disposed in memory on the client 110 that extends the functionality of the application executing the JavaScript. The local data layer may be configured to maintain a local data store on the client 110 such that the trace data structure created by the logging module 124 is maintained when the page reloads. Examples of suitable implementations of a local data layer include Google Gears, available at gears.google.com.

The output module 126 is configured to output the trace data structure created by the logging module 124 to log 132. In certain embodiments the output module 126 is configured to display the log in a user interface, such as a monitor or alternate display apparatus on the client 110. In one embodiment the output module 126 displays a message describing an exception in a user interface on the client 110. In an alternative embodiment the output module 126 is configured to post the log created by the logging module 124 to the server 130. In certain embodiments the output module 126 may be configured to display the log on the client 110 as well as post the log to the server 130.

The system 100 allows the functionality of the user-defined JavaScript code 114 to be maintained in the modified user-defined JavaScript code 128. The JavaScript objects contained within the modified JavaScript code 128 comprise essentially the same objects as contained within the user-defined JavaScript code 114. The difference between the modified JavaScript code 128 and the user-defined JavaScript code 114 being the addition of the logging code added by the modification module 122. Thus, in certain embodiments the modified user-defined JavaScript code 128 is displayed and executed as an XML or HTML file 134 in the browser 112 in the same manner as the unmodified user-defined JavaScript code 114 would be without the modification.

In certain embodiments the profiler JavaScript code 116 comprises the following example JavaScript code:

```
var profiler = {
    // switch debugging on or off. Will call console.log( ).
    debug: true,
    // array that contains all profile data
    data: [ ],
    // maximum number of entries in the log
    maxentries: 100,
    // maximum depth to go to (to avoid infinite loops,
default should be fine)
    maxdepth: 10,
    register: function(objname)
    {   this.log("Profiling " + objname);
        this._init(eval(objname), objname, 0);},
    _init: function(obj, ns, depth)
    {// some security checks
        if(typeof(obj) == "undefined" || obj == null)
        {   this.log("undefined object");
            return; }
        if(depth > this.maxdepth)
        {   this.log("Maxdepth reached");
            return; }
        if(typeof(obj._profiled) != "undefined")
        {   this.log("Already profiled");
            return;     }
        // mark this object as already profiled
        obj._profiled = true;
        for(var key in obj)
        {var log = "Checking " + ns + "." + key + " (" + typeof(obj[key]) + "): ";
            if(typeof(obj[key]) == "object")
            {// skip some nodes
```

```
                    if(key.indexOf("owner") == 0 ||
key.indexOf("parent") == 0)
                    {   this.log(log + "skipped");
                        continue;    }
                    this.log(log + "recursive");
                    this._init(obj[key], ns + "." + key, depth + 1);
// recursive call
                }
                if(typeof(obj[key]) == "function")
                {   // did we already wrap the function?
                    var matches =
obj[key].toString( ).match(/profiler\.(onEntry|onException|onExit)/g);
                    if(matches != null && matches.length == 3)
                    {   this.log(log + "already profiled");
                        continue;        }
                    this.log(log + "profiling");
// add the hook, needs to be a subfunction!
                    this._assign(ns, obj, key);
                }    }    },
    _assign: function(ns, obj, key)
    {   var func = obj[key];
        /* *** WRAPPER FUNCTION *** */
        obj[key] = function( ) {
            profiler.onEntry(ns, key, arguments);
            var ret = null;
            try
            {   var call = "func(";
                sep = "";
                for(var i = 0; i < arguments.length; i++)
                {   call += sep + "arguments[" + i + "]";
                    sep = ",";    }
                call += ");";
                ret = eval(call);
            }
            catch(e)
            {   // get a stacktrace
                profiler.onException(ns, key, arguments, e);
                // pass it on ?
                //throw e;    }
            finally
            {   profiler.onExit(ns, key, arguments);
                return ret;  }
        };},
    _addTrace: function(event, ns, funcname, args)
    {
        var trace = {
            timestamp: new Date( ),
            namespace: ns,
            functionname: funcname,
            arguments: args,
            event: event
        };
        this.data.push(trace);
        // clean up
        while(this.data.length > this.maxentries)
            this.data.shift( );
        return trace;
    },
    onEntry: function(ns, funcname, args)
    {
        this.log("Entry: " + this._funcInfo(ns, funcname, args));
        var trace = this._addTrace("Entry", ns, funcname, args);
    },
    onExit: function(ns, funcname, args)
    {
        this.log("Exit: " + this._funcInfo(ns, funcname, args));
        var trace = this._addTrace("Exit", ns, funcname, args);
    },
    onException: function(ns, funcname, args, exception)
    {
        this.log("Exception: " + this._funcInfo(ns, funcname, args)
+ ": " + exception);
        var trace = this._addTrace("Exception", ns, funcname,
args);
        trace.exception = exception;
    },
    _funcInfo: function(ns, funcname, args)
    {
        var ret = ns + "." + funcname + "(";
        var separator = "";
        var quotes = "";
        for(var i = 0; i < args.length; i++)
        {
            if(typeof(args[i]) == "string")
                quotes = "";
            else
                quotes = "";
            ret += separator + quotes + args[i].toString( ) +
quotes;
            separator = ", ";
        }
        ret += ")";
        return ret;
    },
    log: function(message)
    {
        if(profiler.debug == true && typeof(console) !=
"undefined" && typeof(console.log) != "undefined")
            console.log((new Date).toGMTString( ) + ": " +
message);
    },
    show: function( )
    {
        if(document.getElementById("__profile__") == null)
        {
            var d = document.createElement("DIV");
            d.style.display = "none";
            d.setAttribute("id", "__profile__");
            document.getElementsByTagName("body")[0].appendChild(d);
        }
        var d = document.getElementById("__profile__");
        var c = "";
        c += '<div style="float: right; margin-right: 0px; top:
15px;"><a href="#" onclick="profiler.hide( ); return false;">
Close</a></div>';
        c += '<h1 class="profile__header">Profile output</h1>';
        c += '<ul class="profile__list">';
        for(var i=0; i<this.data.length; i++)
        {
            c += "<li>";
            var e = this.data[i];
            c += '<span class="profile__date">' +
e.timestamp.toGMTString( ) + '</span>: (<span class=
"profile__event">' + e.event
+ '</span>) <span class="profile__function">' +
this._funcInfo(e.namespace, e.functionname, e.arguments) +
'</span>';
            if(e.exception)
                c += '<br />Exception: <span
class="profile__exception">' + e.exception + '</span>';
            c += "</li>";
        }
        c += "</ul>";
        d.innerHTML = c;
        d.style.display = "block";
    },
    hide: function( )
    {
        var d = document.getElementById("__profile__");
        if(d)
        {
            d.style.display = "none";
        }   }};
```

Example Code Listing 1

Those if skill in the art recognize that the profile JavaScript code 116 may include more or fewer features, functions, checks, and conditions as those illustrated in example code 1 in various embodiments of the present invention.

The schematic method schematic diagram that follows is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
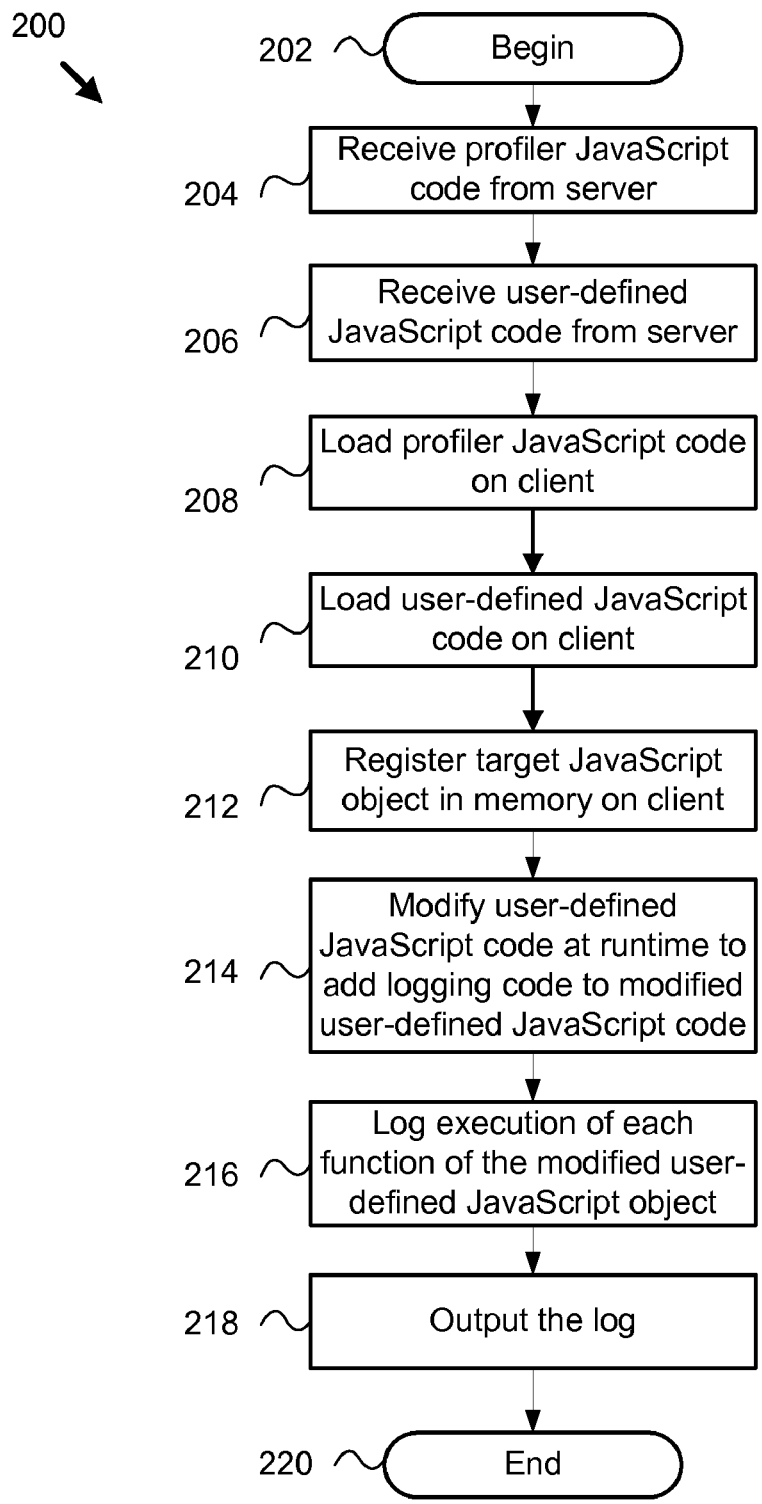
FIG. 2 is a schematic method diagram illustrating one embodiment of a method for injecting logging statements into Web 2.0 JavaScript applications.

FIG. 2 illustrates one embodiment of a method 200 for tracing JavaScript code execution on a client device 110. The method 200 begins 202 and the client 110 receives 204 the profiler JavaScript code 116 on the client 110 from the server 130. The client 110 also receives 206 the user-defined JavaScript code 116 from the server.

Next, the loading module 118 loads 208 the profiler JavaScript code 116 into memory on the client 110. The loading module then loads 210 the user-defined JavaScript code 114 on the client 110.

The registration module 120 registers 212 a target JavaScript object in memory on the client 110. To register 212 the target JavaScript object a JavaScript developer chooses a target JavaScript object to trace and includes a registration instruction and profiler JavaScript code 116 configured register the target JavaScript object. One skilled in the art will recognize that the registration instruction may be included in the user-defined JavaScript code 114, the profiler JavaScript code 116, a XML or HTML file with embedded JavaScript, one or more JavaScript libraries, or a combination of these. In certain embodiments the target JavaScript object is defined in the user-defined JavaScript code 114.

The modification module 122 modifies 214 the user-defined JavaScript code 114 at runtime by injecting a logging code into the JavaScript object and storing the modified user-defined JavaScript code 128 in memory on the client 110. The modified user-defined JavaScript code 128 comprises the user-defined JavaScript code 114 with an event added to each function of the target JavaScript object identifying when the JavaScript object is called. The modified user-defined JavaScript code 128 further comprises the user-defined JavaScript code 114 with an event added to each function of the target JavaScript object identifying when the JavaScript object is exited. Finally, the modified user-defined JavaScript code 128 further comprises an event identifying when an exception occurs within the function of the target JavaScript object. In certain embodiments the modification module 122 is wrapped into a try/catch block of JavaScript code within the profiler JavaScript code 116 so that exceptions can be handled and posted back to the server 130 or displayed to the user or developer.

The method 200 continues by logging 216 the execution of each function of the modified user-defined JavaScript code 128 in response to runtime calls to functions of the target JavaScript object. In certain embodiments the logging 216 comprises keeping a trace data structure of the function calls including an indication of when the function was called, when the function was exited and when an exception occurs. In one embodiment the logging 216 includes logging all function calls of the modified user-defined JavaScript code 128. In one embodiment only function calls of registered target objects are logged 216.

Finally, the method 200 outputs 218 the log 132 and the method ends 220. In certain embodiments, output module 126 displays the log 132 in a user interface on the client 110.

In one embodiment the output module 126 displays a message describing an exception in a user interface. In another embodiment the output module 126 posts the log 132 to the server 130.

In one embodiment, some of the benefits of the current method, system and apparatus include containing all logging and tracing code within a single location, no need to modify the existing source code at the server or prior to delivery to the client, the profiler JavaScript code 116 works with all browsers that support JavaScript 1.5, there is no need for separate additional software, tracing is performed on the client 110 and posted back to the server and finally, a JavaScript developer can access the log 132 at any time.

In one embodiment the profiler JavaScript code 116 is implemented as part of a toolkit (such as IBM Dojo). In one embodiment, profiler JavaScript code 116 is implemented in commercial or open source test platforms. In an alternative embodiment the profiler JavaScript code 116 is implemented as an individual function in a JavaScript application.

What is claimed is:

1. A computer program product for tracing JavaScript code execution on a client device executing JavaScript code, the computer program product comprising a single block of JavaScript code configured to execute on the client device, the operations of the computer program product comprising:
   receiving profiler JavaScript code from a server;
   receiving user-defined JavaScript code from the server;
   loading the profiler JavaScript code in the memory on the client device, the profiler JavaScript code configured to dynamically redefine each function of a registered target JavaScript object in the memory on the client device;
   loading the user-defined JavaScript code in memory on the client device, the user-defined JavaScript code comprising a registration JavaScript instruction;
   registering a target JavaScript object in a memory on the client device, in response to loading a registration JavaScript instruction, the registration JavaScript instruction identifying the target JavaScript object, the target JavaScript object defined in the user-defined JavaScript code, the profiler JavaScript code dynamically loading the registered target JavaScript object;
   modifying the user-defined JavaScript code at runtime in memory on the client device for each JavaScript object identified by a registration JavaScript instruction in the user-defined JavaScript code by injecting a logging code into the JavaScript object and storing the modified user-defined JavaScript object in memory on the client device, the logging code comprising;
      an event added to each function of the target JavaScript object of the modified user-defined JavaScript object identifying when the function of the target JavaScript object is called;
      an event added to each function of the target JavaScript object of the modified user-defined JavaScript code identifying when the function of the target JavaScript object is exited; and
      an event added to each function of the target JavaScript object of the modified user-defined JavaScript code identifying when an exception occurs within the function of the target JavaScript object;
   logging execution of each function of the modified user-defined JavaScript object in response to runtime calls to the function of the modified user-defined JavaScript object from the user-defined JavaScript code; and
   outputting the log.

2. The computer program product of claim 1, wherein outputting the log comprises displaying the log in a user interface of the client device.

3. The computer program product of claim 1, wherein outputting the log comprises displaying a message describing an exception in a user interface of the client device.

4. The computer program product of claim 1, wherein outputting the log comprises posting the log to a server that sent the user-defined JavaScript code.

5. A method for tracing JavaScript code execution on a client device executing JavaScript code, the method comprising:
   receiving profiler JavaScript code from a server;
   receiving user-defined JavaScript code from the server;
   loading the profiler JavaScript code in a memory on the client device, the profiler JavaScript code configured to dynamically redefine each function of a registered target JavaScript object in the memory on the client device;
   loading the user-defined JavaScript code in memory on the client device, the user-defined JavaScript code comprising a registration JavaScript instruction;
   registering a target JavaScript object in a memory on the client device, in response to loading a registration JavaScript instruction, the registration JavaScript instruction identifying the target JavaScript object, the target JavaScript object defined in the user-defined JavaScript code, the profiler JavaScript code dynamically loading the registered target JavaScript object;
   modifying the user-defined JavaScript code at runtime in memory on the client device for each JavaScript object identified by a registration JavaScript instruction in the user-defined JavaScript code by injecting a logging code into the JavaScript object and storing the modified user-defined JavaScript object in memory on the client device, the logging code comprising;
      an event added to each function of the target JavaScript object of the modified user-defined JavaScript object identifying when the function of the target JavaScript object is called;
      an event added to each function of the target JavaScript object of the modified user-defined JavaScript code identifying when the function of the target JavaScript object is exited; and
      an event added to each function of the target JavaScript object of the modified user-defined JavaScript code identifying when an exception occurs within the function of the target JavaScript object;
   logging execution of each function of the modified user-defined JavaScript object in response to runtime calls to the function of the modified user-defined JavaScript object from the user-defined JavaScript code; and
   outputting the log.

6. The method of claim 5, wherein outputting the log comprises displaying the log in a user interface of the client device.

7. The method of claim 5, wherein outputting the log comprises displaying a message describing an exception in a user interface of the client device.

8. The method of claim 5, wherein outputting the log comprises posting the log to the server that sent the user-defined JavaScript code.

* * * * *